(12) United States Patent
Lu (10) Patent No.: US 11,750,905 B2
(45) Date of Patent: Sep. 5, 2023

(54) VEHICULAR CAMERA WITH INDUCTIVE LENS HEATER

(71) Applicant: Magna Electronics Inc., Auburn Hills, MI (US)

(72) Inventor: Yuesheng Lu, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 96 days.

(21) Appl. No.: 17/445,006

(22) Filed: Aug. 13, 2021

(65) Prior Publication Data

US 2022/0053112 A1 Feb. 17, 2022

Related U.S. Application Data

(60) Provisional application No. 62/706,398, filed on Aug. 14, 2020.

(51) Int. Cl.
| | |
|---|---|
| *H04N 5/225* | (2006.01) |
| *H04N 23/55* | (2023.01) |
| *B60R 11/04* | (2006.01) |
| *H05B 3/84* | (2006.01) |
| *H04N 23/51* | (2023.01) |
| *H04N 23/57* | (2023.01) |
| *B60R 11/00* | (2006.01) |

(52) U.S. Cl.
CPC ............ *H04N 23/55* (2023.01); *B60R 11/04* (2013.01); *H04N 23/51* (2023.01); *H04N 23/57* (2023.01); *H05B 3/84* (2013.01); *B60R 2011/004* (2013.01)

(58) Field of Classification Search
CPC . B30B 9/3096; B60R 11/04; B60R 2011/004; H04N 5/2252; H04N 5/22521; H04N 5/2253; H04N 5/2254
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |

(Continued)

*Primary Examiner* — Md N Haque
(74) *Attorney, Agent, or Firm* — HONIGMAN LLP (57) ABSTRACT

A vehicular camera includes a camera housing, a lens assembly having a lens barrel and a lens disposed in the lens barrel, an imager printed circuit board (PCB) disposed in the camera housing, and an induction heating device having an inductive coil that at least partially circumscribes a portion of the lens assembly. The inductive coil is disposed at the imager PCB and is electrically connected to circuitry of the imager PCB. The camera housing includes an electrical connector that is configured to electrically connect with an electrical connector of a vehicle. With the vehicular camera disposed at the vehicle, the heating device is operable to generate a magnetic field that induces electrical current in the portion of the lens assembly to generate heat at the portion of the lens assembly to heat at least part of the lens.

25 Claims, 6 Drawing Sheets

(56) References Cited

U.S. PATENT DOCUMENTS

| | | | |
|---|---|---|---|
| 6,222,447 | B1 | 4/2001 | Schofield et al. |
| 6,302,545 | B1 | 10/2001 | Schofield et al. |
| 6,396,397 | B1 | 5/2002 | Bos et al. |
| 6,498,620 | B2 | 12/2002 | Schofield et al. |
| 6,523,964 | B2 | 2/2003 | Schofield et al. |
| 6,611,202 | B2 | 8/2003 | Schofield et al. |
| 6,636,258 | B2 | 10/2003 | Strumolo |
| 6,690,268 | B2 | 2/2004 | Schofield et al. |
| 6,717,610 | B1 | 4/2004 | Bos et al. |
| 6,757,109 | B2 | 6/2004 | Bos |
| 6,802,617 | B2 | 10/2004 | Schofield et al. |
| 6,806,452 | B2 | 10/2004 | Bos et al. |
| 6,822,563 | B2 | 11/2004 | Bos et al. |
| 6,882,287 | B2 | 4/2005 | Schofield |
| 6,891,563 | B2 | 5/2005 | Schofield et al. |
| 6,946,978 | B2 | 9/2005 | Schofield |
| 7,005,974 | B2 | 2/2006 | McMahon et al. |
| 7,038,577 | B2 | 5/2006 | Pawlicki et al. |
| 7,145,519 | B2 | 12/2006 | Takahashi et al. |
| 7,161,616 | B1 | 1/2007 | Okamoto et al. |
| 7,230,640 | B2 | 6/2007 | Regensburger et al. |
| 7,248,283 | B2 | 7/2007 | Takagi et al. |
| 7,295,229 | B2 | 11/2007 | Kumata et al. |
| 7,301,466 | B2 | 11/2007 | Asai |
| 7,592,928 | B2 | 9/2009 | Chinomi et al. |
| 7,720,580 | B2 | 5/2010 | Higgins-Luthman |
| 7,855,755 | B2 | 12/2010 | Weller et al. |
| 7,859,565 | B2 | 12/2010 | Schofield et al. |
| 7,881,496 | B2 | 2/2011 | Camilleri et al. |
| 7,965,336 | B2 | 6/2011 | Bingle et al. |
| 8,542,451 | B2 | 9/2013 | Lu et al. |
| 8,694,224 | B2 | 4/2014 | Chundrlik, Jr. et al. |
| 8,994,878 | B2 | 3/2015 | Byrne et al. |
| 9,036,026 | B2 | 5/2015 | Dellantoni et al. |
| 9,077,098 | B2 | 7/2015 | Latunski |
| 9,277,104 | B2 | 3/2016 | Sesti et al. |
| 9,621,769 | B2 | 4/2017 | Mai et al. |
| 10,071,687 | B2 | 9/2018 | Ihlenburg et al. |
| 10,142,532 | B2 | 11/2018 | Mleczko |
| 10,230,875 | B2 | 3/2019 | Mleczko et al. |
| 10,250,004 | B2 | 4/2019 | Conger et al. |
| 10,272,857 | B2 | 4/2019 | Conger et al. |
| 10,761,319 | B2 | 9/2020 | Kumar |
| 10,894,275 | B2 | 1/2021 | Byrne et al. |
| 11,140,301 | B2 | 10/2021 | Condron et al. |
| 11,535,158 | B2 | 12/2022 | Liu et al. |
| 2009/0244361 | A1 | 10/2009 | Gebauer et al. |
| 2010/0097519 | A1* | 4/2010 | Byrne ............... B60R 1/00 348/373 |
| 2010/0208077 | A1* | 8/2010 | DeWard ............... G06V 20/56 348/148 |
| 2012/0062743 | A1 | 3/2012 | Lynam et al. |
| 2013/0242099 | A1 | 9/2013 | Sauer et al. |
| 2014/0218535 | A1 | 8/2014 | Ihlenburg et al. |
| 2014/0373345 | A1 | 12/2014 | Steigerwald |
| 2015/0124098 | A1 | 5/2015 | Winden et al. |
| 2015/0222795 | A1 | 8/2015 | Sauer et al. |
| 2015/0327398 | A1 | 11/2015 | Achenbach et al. |
| 2016/0037028 | A1 | 2/2016 | Biemer |
| 2016/0243987 | A1 | 8/2016 | Kendall |
| 2016/0264064 | A1 | 9/2016 | Byrne et al. |
| 2016/0268716 | A1 | 9/2016 | Conger et al. |
| 2016/0272163 | A1 | 9/2016 | Dreiocker et al. |
| 2016/0286103 | A1 | 9/2016 | Van Dan Elzen |
| 2017/0129419 | A1 | 5/2017 | Conger et al. |
| 2017/0133811 | A1 | 5/2017 | Conger et al. |
| 2017/0201661 | A1 | 7/2017 | Conger |
| 2017/0280034 | A1* | 9/2017 | Hess ............... H04N 23/57 |
| 2017/0295306 | A1 | 10/2017 | Mleczko |
| 2018/0098033 | A1 | 4/2018 | Mleczko et al. |
| 2018/0152609 | A1* | 5/2018 | Wang ............... H05K 999/99 |
| 2018/0170279 | A1* | 6/2018 | Achenbach ............ H04N 7/181 |
| 2018/0207691 | A1 | 7/2018 | Byrne et al. |
| 2018/0338070 | A1* | 11/2018 | Sigle ............... H04N 23/57 |
| 2018/0338071 | A1* | 11/2018 | Becker ............... B60R 11/04 |
| 2019/0113743 | A1 | 4/2019 | Kumar |
| 2020/0314311 | A1 | 10/2020 | Liu et al. |
| 2022/0089102 | A1 | 3/2022 | Sauer et al. |

* cited by examiner

VEHICULAR CAMERA WITH INDUCTIVE LENS HEATER

CROSS REFERENCE TO RELATED APPLICATION

The present application claims the filing benefits of U.S. provisional application Ser. No. 62/706,398, filed Aug. 14, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Obscuring view by condensation or ice, as well as mud, salt or dust is becoming an increasing issue for vehicle cameras as their ability to determine and recognize objects can be limited or interrupted. Vehicle manufacturers have recently started to add a lens heating function within some cameras to defog the elements when needed. This function is typically very expensive and it is difficult to assemble the heating element inside of the camera and to seal the camera with the additional wires for powering the heating elements at the lens or lens barrel.

SUMMARY OF THE INVENTION

The present invention provides a vision system or imaging system for a vehicle that utilizes one or more cameras (preferably one or more CMOS cameras) to capture image data representative of images exterior of the vehicle, and provides a heating element to heat the lens of the camera. The camera may be mounted or disposed at an exterior structure of the vehicle, such as, for example, a vehicle panel, grill, bumper, fascia, light bar, center high mounted stop lamp (CHMSL) or the like, with its lens viewing exterior of the vehicle. The heating element comprises an inductive heating device that at least partially circumscribes the lens barrel and operates to generate a magnetic field to induce electrical current in a portion or portions of the lens assembly or lens barrel or lens support structure to heat the portion or portions of the lens assembly or lens barrel or lens support structure and thus to heat the lens optics or lens elements of the lens.

These and other objects, advantages, purposes and features of the present invention will become apparent upon review of the following specification in conjunction with the drawings.

DESCRIPTION OF THE PREFERRED EMBODIMENTS

A vehicular vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
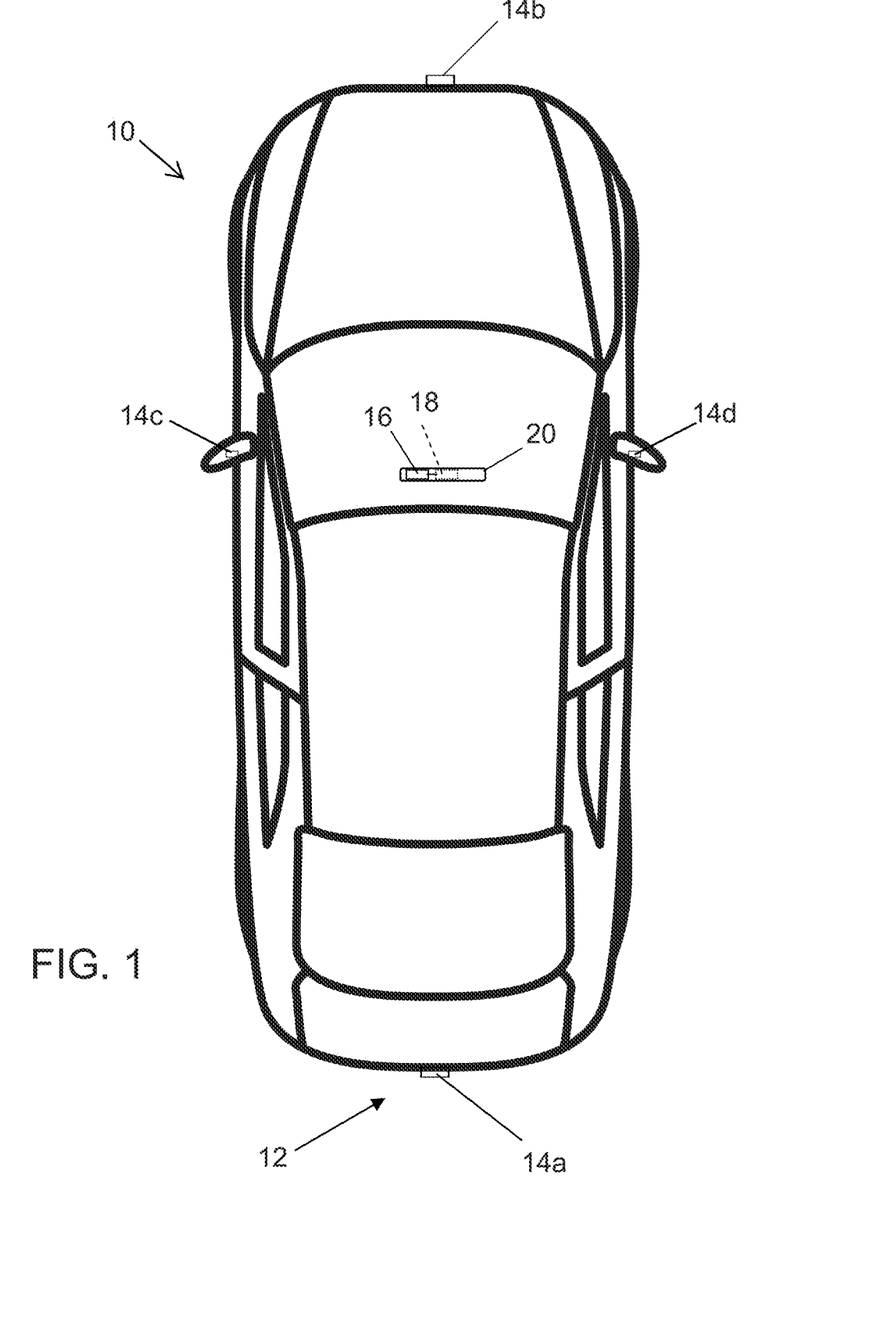
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The cameras each include a housing and imager and a lens that is oriented such that the camera views exterior of the vehicle. Because the camera is disposed at the vehicle exterior, such cameras are exposed to cold temperatures and temperature and humidity fluctuations, whereby moisture and/or ice or snow may form or collect at the lens. Such automotive camera lenses are also susceptible to dirt or debris collecting at the lens of the camera. This is particularly an issue for cameras mounted at the front of a vehicle, such as at a front bumper or grill or fascia of the vehicle, or at the rear of the vehicle.

Figure 2:
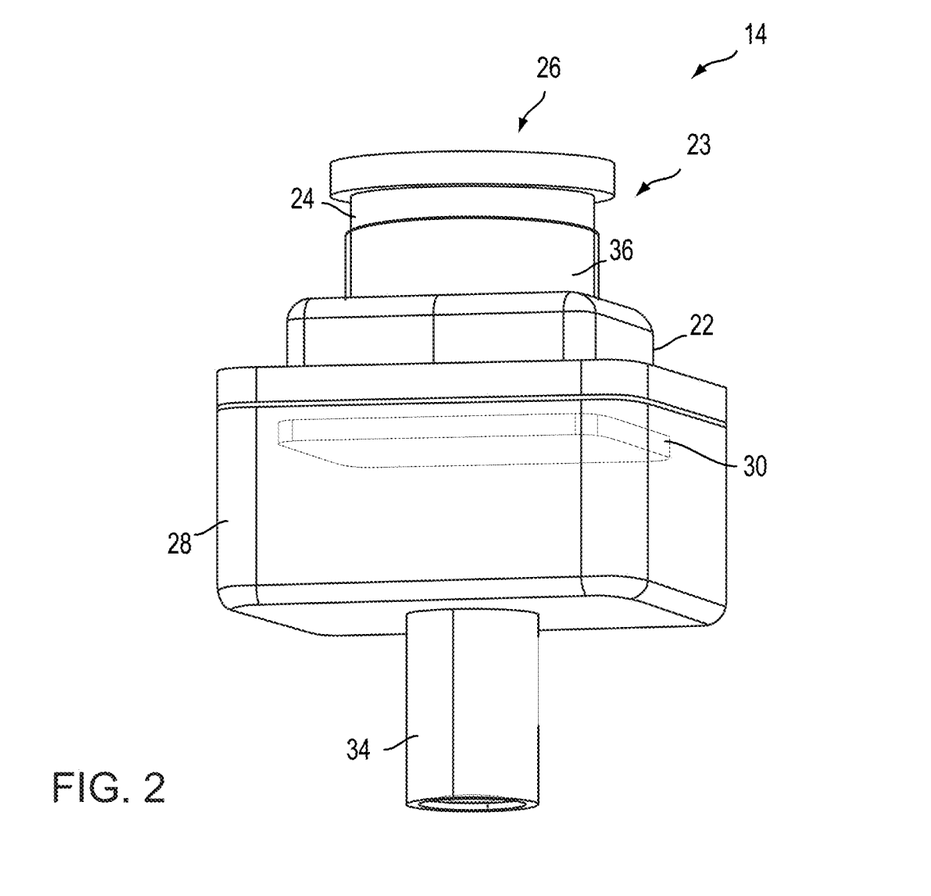
FIG. 2 is a perspective view of a camera and heater element in accordance with the present invention.

As shown in FIG. 2, the camera 14 includes a lens holder or front housing portion 22, which supports or accommodate a lens assembly 23, which includes a lens barrel 24 (such as a cylindrical lens barrel) that houses or accommodates a lens 26 having a plurality of lens optics or lens elements. The lens barrel may comprise a metal lens barrel (or may comprise any other suitable material, such as a plastic or polymeric or thermoplastic material or the like). The camera includes a rear housing portion 28 that is mated with the front housing portion 22 to encase the printed circuit board 30 (having the imager 32 disposed thereat and aligned with the lens) therein. The rear housing portion 28 includes a connector portion 34 (such as a coaxial connector) for electrically connecting the camera to a wire harness or coaxial connector of the vehicle. The camera includes an inductive heating device 36 disposed at the lens barrel and at least partially circumscribing the lens barrel. The heating device may be disposed at an exterior surface of the lens barrel or at an interior surface of the lens barrel or may be integrated in the lens barrel.

Figure 3:
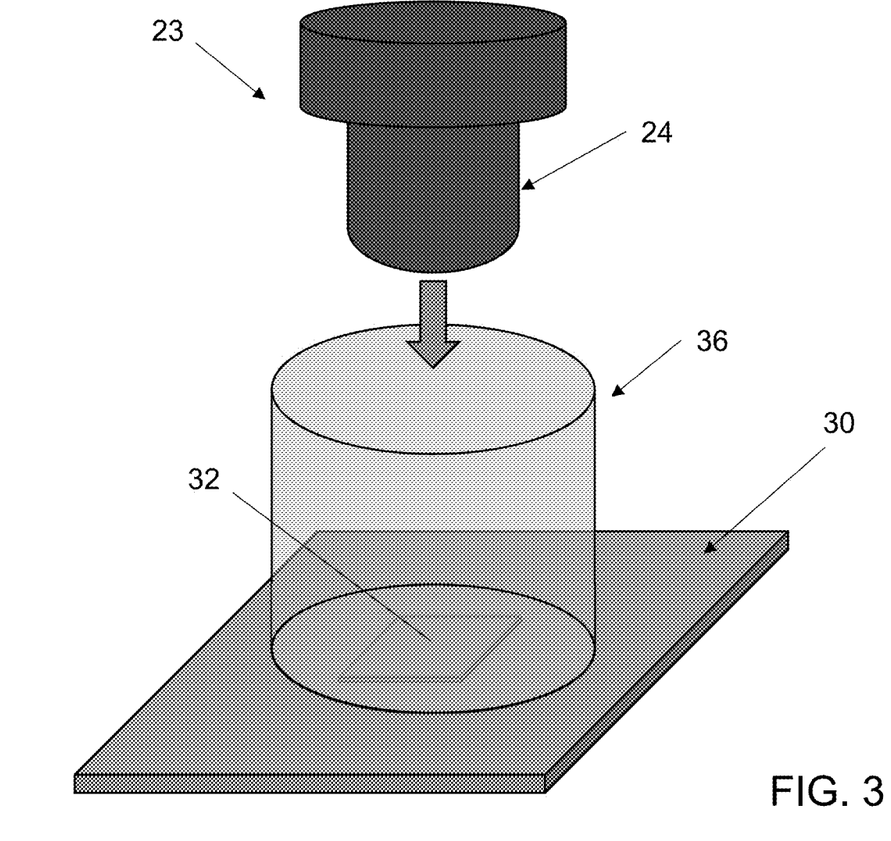
FIG. 3 is a perspective view of the imager PCB and lens barrel with the inductive heating device.

As shown in FIG. 3 the heating device 36 is disposed at the PCB 30. The device comprises an inductive coil that is disposed at the PCB and that extends or protrudes from the imager side of the PCB (the side of the PCB at which the imager 32 is disposed). The device includes two electrical leads that electrically connect to circuitry of the PCB, such as via soldering the two electrical leads of the heating device 36 to the PCB. The inductive coil is disposed at the PCB and around the imager 32, and the lens barrel 24 of the lens assembly 23 is received or disposed at least partially within or circumscribed by the inductive coil.

During operation, inductive alternating current (AC) flows in the inductive coil to create an electromagnetic field and to induce electrical current inside the metal lens barrel's wall (or inside another suitable component or element or structure of the lens assembly 23, such as internal metal or metallic lens spacers or the like). The material of the lens barrel (or other selected or targeted component or element or structure of the lens assembly) is selected to be electrically conductive or semiconductive so that the electrical current can be induced within the material via the electromagnetic field created when the electrical current runs through the inductive coil. The current generated in and flowing through the material of the lens barrel (or other selected or targeted portion of the lens assembly) transfers to heat and heats the lens barrel or other component and thus heats the lens elements. Outside of the coil, the electromagnetic field is minimum, and thus inductive heating of the camera housing (and other non-targeted components) is at a minimum. Optionally, components of the camera housing may comprise nonconductive materials to avoid unwanted heating of such components. The adhesive that holds the lens barrel to the lens holder (e.g., UV cured adhesive) acts as a thermal barrier to retain the heat in the lens barrel and at the lens.

The heating device 36, via the inductive coil, may be configured to induce current in a portion of the lens assembly, such as in the lens barrel and/or the lens retaining structure and/or lens spacing elements within the lens barrel. The heating device may create a magnetic field to induce current in one or more different parts of the lens assembly or lens holding structure and elements, without inducing current in other parts of the lens assembly or lens holding structure and elements, depending on the design and configuration of the heating device and inductive coil and depending on the electrically conductive or semiconductive nature of the components. The lens assembly thus may comprise one or more elements or portions or components that comprises a material (such as an electrically conductive metallic material) that is suitable for inducing eddy current therein, and may comprise electrically or magnetically isolating elements or materials that electrically or magnetically isolate other parts of the lens assembly to limit or preclude inducement of eddy currents in other parts of the lens assembly. For example, the inductive coil may be disposed inside or outside or integrated in the lens barrel and, in any such location, is operable to generate a magnetic field to induce electric current in only an electrically conductive portion or plurality of electrically conductive portions of the lens assembly. As discussed below, the electrically conductive portion or portions of the lens assembly may comprise the lens barrel, lens spacers, and/or any suitable portion for heating lens or optic elements of the lens assembly. Thus, the heating device is electrically operable to generate a magnetic field via the inductive coil. Because the inductive coil circumscribes a portion of the lens assembly comprising an electrically conductive or semiconductive material, the magnetic field induces an electrical current in the portion of the lens assembly, causing that portion of the lens assembly to heat. The portion of the lens assembly thus heats the lens assembly, and particularly the lens element or at least the outermost lens element, to deice or defog or preclude condensation from forming thereat.

Figure 4:
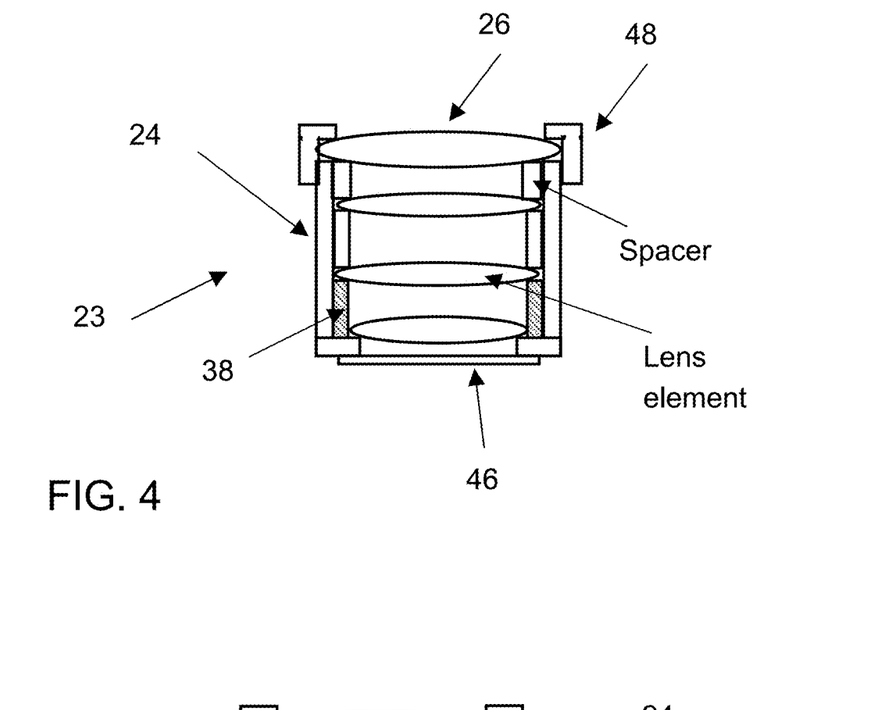
FIGS. 4-9 are sectional view of the lens assembly, showing how the heating device can inductively heat different portions of the lens assembly, such as the lens barrel and/or spacer elements and/or heater rings or disks to heat the lens elements to de-ice the lens and limit condensation at the lens.
Figure 5:
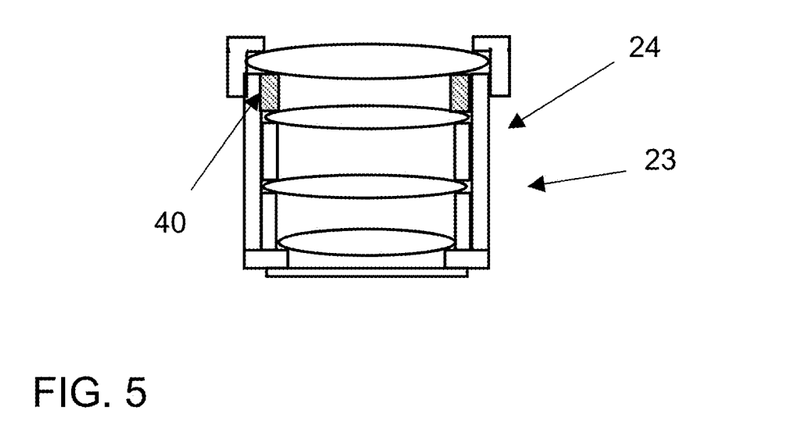

For example, and such as shown in FIGS. 4 and 5, the lens assembly 23 may include one or more heater rings or disks 38, 40, which function as a lens spacer, and the heating device may operate to induce the heater rings or disks (which may comprise a suitable material for inducing eddy current therein, such as a suitable metal or metallic material or a suitable electrically conductive material) with eddy current to generate heat at the lens spacers and lens optics to heat up the lens optics disposed in the lens barrel to de-ice the lens and limit or avoid condensation at the lens. Thus, the inductive coil circumscribes the lens barrel at a position that encompasses at least the heater rings or disks 38, 40 so that, when electrically powered, a magnetic field is generated that encompasses the heater rings or disks and induces electrical current therein. The heater rings or disks 38, 40 may comprise any one of a plurality of lens spacers of the lens assembly. For example, the heater rings or disks 38, 40 may comprise a lens spacer adjacent an innermost lens optic (FIG. 4), a lens spacer adjacent an outermost lens optic (FIG. 5), and/or a lens spacer at any position within the lens assembly, or all of a plurality of lens spacers within the lens assembly.

Figure 6:
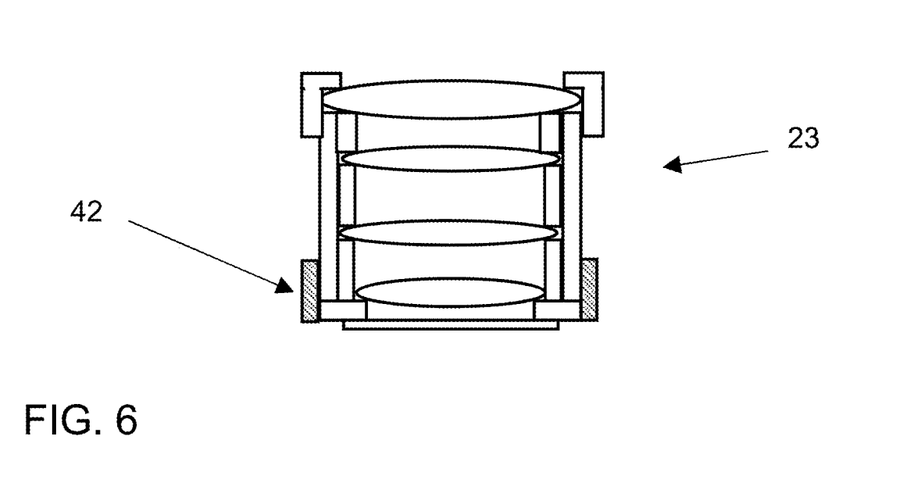

Optionally, and such as shown in FIG. 6, the lens assembly 23 includes a heater ring or disk 42 attached at an outside of the lens barrel 24 (and circumscribing and contacting an outer surface of the lens barrel), and the heating device may operate to induce the heater ring or disk 42 with eddy current to generate heat at the lens barrel to heat up the lens barrel and the lens optics disposed in the lens barrel to de-ice the lens and limit or avoid condensation at the lens. Thus, the inductive coil circumscribes at least a portion of the lens barrel that includes the heater ring or disk 42 at the outer surface of the lens barrel so that, when the inductive coil is electrically powered, a magnetic field generated by the inductive coil encompasses the heater ring or disk 42. The heater ring or disk 42 may be positioned at any suitable position along the lens barrel.

Figure 7:
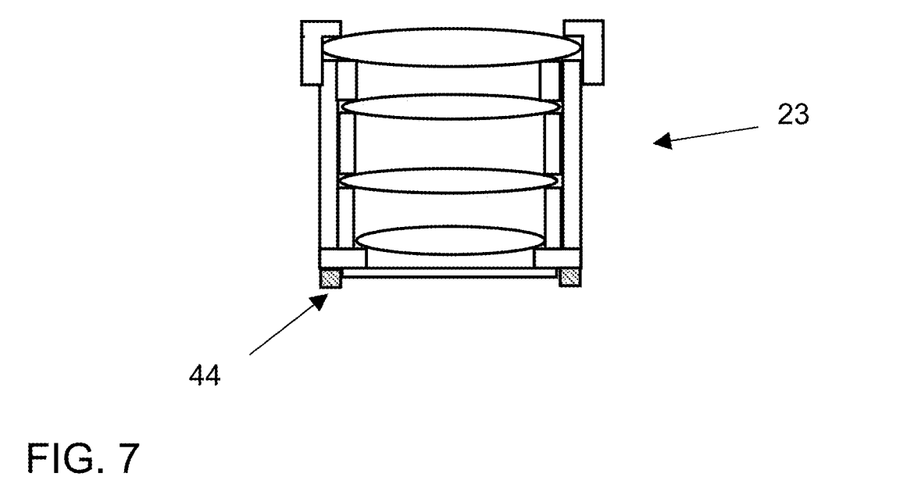

Optionally, and such as shown in FIG. 7, the lens assembly 23 includes a heater ring or disk 44 attached at the bottom or inward end of the lens barrel 24 (such as at and around or circumscribing an infrared cutoff filter 46 at the end of the lens barrel), and the heating device may operate to induce the heater ring or disk 44 with eddy current to generate heat at the end of the lens barrel to heat up the lens barrel and the lens optics disposed in the lens barrel to de-ice the lens and limit or avoid condensation at the lens. Thus, the inductive coil circumscribes the lens barrel at a position that encompasses at least the heater ring or disk 44 at the bottom or inward end of the lens barrel 24 so that, when electrically powered, a magnetic field is generated that encompasses the heater ring or disk 44 to induce electrical current therein.

Figure 8:
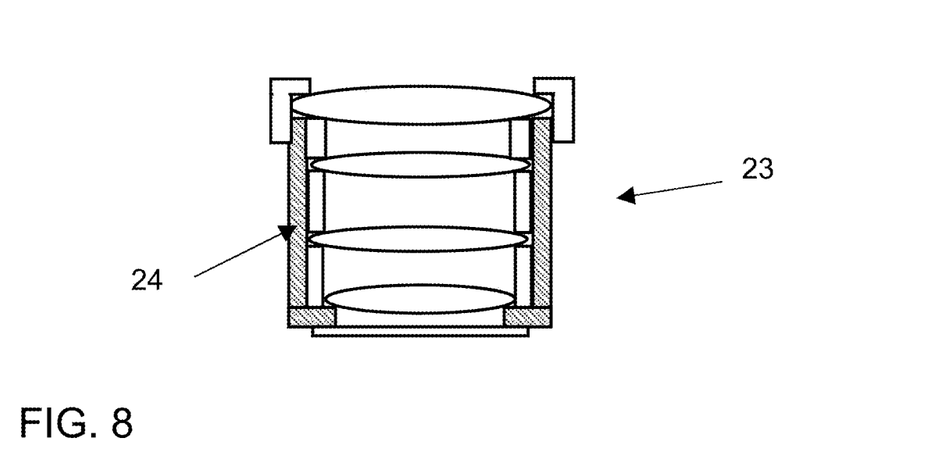
Figure 9:
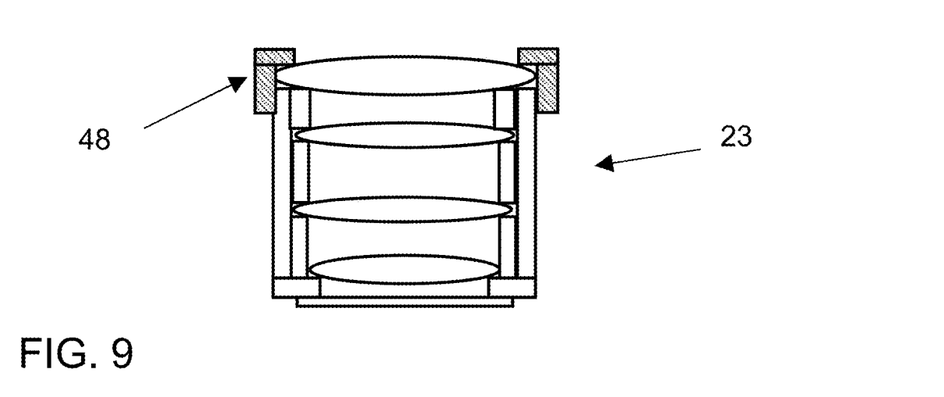

Optionally, and such as shown in FIG. 8, the lens barrel 24 of the lens assembly may be heated by inducing the barrel wall with eddy current to generate heat at the barrel wall to heat up the lens optics disposed in the lens barrel to de-ice the lens and limit or avoid condensation at the lens. Optionally, and such as shown in FIG. 9, the lens retainer cap 48 of the lens assembly 23 may be heated by being induced with eddy current to generate heat at the retainer cap and around the outermost lens optic to heat up the lens optic to de-ice the lens and limit or avoid condensation at the lens.

Thus, the heating device of the present invention comprises an inductive heating coil or element that is disposed at or at least partially around the lens assembly or lens barrel of the exterior vehicle camera, whereby the inductive heating coil at least partially circumscribes the lens barrel so as to rapidly heat the lens barrel (and lens optics disposed therein) when the heating device is powered and a magnetic field is generated that encompasses the lens barrel. The inductive heating coil of the heating device may be configured to at least partially circumscribe a selected or targeted portion of the lens assembly to induce eddy currents in that portion. Heating of the portion of the lens assembly may result in heating of the entirety or a larger portion of the lens assembly (such as the lens elements and lens barrel) to deice, defog, and preclude condensation from forming at the lens. Optionally, the inductive heating coil may circumscribe the lens assembly and may be selectively powered to induce eddy currents in selected or targeted portions of the lens assembly while not inducing eddy currents in other non-selected or non-targeted portions of the lens assembly. For example, the selected portions may comprise an electrically conductive or semiconductive material and the non-selected portions may comprise a non-electrically-conductive material.

The heating device may be electrically powered (i.e., electric current run through the inductive heating coil) responsive to a signal from an ECU of the vehicle or of the camera assembly. For example, the ECU, via processing of image data, may determine the presence of ice or condensation or other occlusion at the camera lens, and electrically power the heating device in an attempt to clear the ice or condensation or occlusion. Because induction heating often results in rapid and extreme rises in temperature, the heating device may only be powered for relatively short amounts of time to prevent overheating or other damage to the camera device. Optionally, the heating device may be selectively powered and unpowered responsive to a thermal sensor at or near the camera device to reduce the chances of overheating or damage to the camera device.

The induction heating device satisfies the need for lens heating of an exterior camera that is exposed to the outside environment to perform de-icing of the lens and to avoid condensation at the lens. Other heating devices or systems for heating the lens may include a heater wrapped around the lens barrel, or disposed underneath the top glass of lens assembly, or established as an electrically conductive top coating to heat the lens surface. Such prior devices and systems require wires at or in the lens barrel to bring in electrical current to generate the heat. Wiring into the camera's interior while keeping the camera body sealed is very challenging and quite expensive.

The heating device or circuitry associated with the heating device is at the imager circuit board of the camera and may be directly electrically connected to a vehicle harness or may be connected to or integrated into the camera wiring. Activation and control of the heating element may be via signals or inputs to and from the camera to the vehicle's communication network. Control of the heating device may also be provided by way of integrated temperature sensor and timer. For example, a temperature sensor may be included at the camera heating device such that, when the sensed temperature drops below a lower threshold temperature, the heating device is automatically activated to induce the eddy currents to heat the targeted portion of the lens assembly to limit or preclude moisture or ice forming on the lens optics or elements. The heating device may be deactivated when the temperature reaches an upper threshold temperature or after the heating device has been activated for a threshold period of time.

The camera may optionally also include a fluid spraying device that connects to a pressurized fluid supply and has a fluid passageway and nozzle so as to spray fluid onto the lens to clean the lens of dirt or debris. The spraying or cleaning device may operate with or separate from the heating device.

Thus, the present invention provides a heating system (and optionally a washer system too) that can be disposed at a vehicular camera (such as at and at least partially or entirely around a lens barrel of the camera) for heating the lens. The vehicular camera may utilize aspects of the cameras described in U.S. Publication Nos. US-2019-0113743; US-2018-0207691; US-2016-0272163 and/or US-2016-0264064, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera comprising:

a camera housing;

a lens assembly comprising a lens barrel and a lens having optic elements disposed in the lens barrel;

an imager printed circuit board (imager PCB), the imager PCB having a first side and a second side separated from the first side by a thickness of the imager PCB, wherein an imager is disposed at the first side of the imager PCB;

wherein the imager PCB is at least partially housed by the camera housing;

wherein the lens assembly is at least partially housed by the camera housing;

an induction heating device comprising an inductive coil that at least partially circumscribes at least a portion of the lens assembly;

wherein the camera housing includes an electrical connector that is configured to electrically connect with an electrical connector of a vehicle when the vehicular camera is disposed at the vehicle to electrically connect electronic circuitry of the vehicular camera to a power source of the vehicle;

wherein, with the vehicular camera disposed at the vehicle and with the electrical connector electrically connected with the electrical connector of the vehicle, the induction heating device, when electrically powered, generates a magnetic field, and wherein the magnetic field induces electrical current at least in the portion of the lens assembly that is at least partially circumscribed by the inductive coil of the induction heating device to heat at least the portion of the lens assembly that is at least partially circumscribed by the inductive coil of the induction heating device; and wherein the induction heating device, when electrically powered, generates the magnetic field to induce electrical current in the portion of the lens assembly, and wherein the generated magnetic field does not induce electrical current in other portions of the lens assembly.

2. The vehicular camera of claim 1, wherein the lens assembly comprises a lens spacer disposed between adjacent optic elements of the lens, and wherein the induction heating device, when electrically powered, generates the magnetic field to induce electrical current in the lens spacer to generate heat in the lens spacer to heat at least one optic element at or near the lens spacer.

3. A vehicular camera comprising:

a camera housing;

a lens assembly comprising a lens barrel and a lens having optic elements disposed in the lens barrel;

an imager printed circuit board (imager PCB), the imager PCB having a first side and a second side separated from the first side by a thickness of the imager PCB, wherein an imager is disposed at the first side of the imager PCB;

wherein the imager PCB is at least partially housed by the camera housing;

wherein the lens assembly is at least partially housed by the camera housing;

an induction heating device comprising an inductive coil that at least partially circumscribes at least a portion of the lens assembly;

wherein the camera housing includes an electrical connector that is configured to electrically connect with an electrical connector of a vehicle when the vehicular camera is disposed at the vehicle to electrically connect electronic circuitry of the vehicular camera to a power source of the vehicle;

wherein, with the vehicular camera disposed at the vehicle and with the electrical connector electrically connected with the electrical connector of the vehicle, the induction heating device, when electrically powered, generates a magnetic field, and wherein the magnetic field induces electrical current at least in the portion of the lens assembly that is at least partially circumscribed by the inductive coil of the induction heating device to heat at least the portion of the lens assembly that is at least partially circumscribed by the inductive coil of the induction heating device; and wherein the lens assembly comprises an innermost optic element, an outermost optic element, and at least one middle optic element disposed between the outermost optic element and the innermost optic element, and wherein the lens assembly comprises a plurality of lens spacers disposed between adjacent optic elements, and wherein the induction heating device, when electrically powered, generates the magnetic field to induce electrical current in each of the lens spacers to generate heat in the lens spacers to heat each of the optic elements.

4. The vehicular camera of claim 3, wherein, with the vehicular camera disposed at the vehicle, the outermost optic element is exposed at an exterior portion of the vehicle.

5. The vehicular camera of claim 1, wherein the lens assembly comprises a heater ring disposed at and circumscribing and contacting an outer surface of the lens barrel, and wherein the induction heating device, when electrically powered, generates the magnetic field to induce electrical current in the heater ring to generate heat in the heater ring to heat at least a portion of the lens barrel and to heat at least some of the optic elements disposed in the lens barrel.

6. The vehicular camera of claim 1, wherein the lens assembly comprises a heater ring disposed at an end of the lens barrel that opposes the first side of the imager PCB at which the imager is disposed, and wherein the induction heating device, when electrically powered, generates the magnetic field to induce electrical current in the heater ring to generate heat in the heater ring to heat at least a portion of the lens barrel and to heat at least some of the optic elements disposed in the lens barrel.

7. The vehicular camera of claim 6, wherein the heater ring circumscribes an infrared filter disposed at the end of the lens barrel that opposes the first side of the imager PCB at which the imager is disposed.

8. The vehicular camera of claim 1, wherein the induction heating device, when electrically powered, generates the magnetic field to induce electrical current in a cylindrical wall structure of the lens barrel to generate heat at the lens barrel to heat the lens barrel and the optic elements disposed in the lens barrel.

9. The vehicular camera of claim 1, wherein the lens assembly comprises an end cap disposed at an outer end of the lens barrel that is opposite an inner end of the lens barrel that opposes the first side of the imager PCB at which the imager is disposed, and wherein the induction heating device, when electrically powered, generates the magnetic field to induce electrical current in the end cap to generate heat in the end cap to heat at least a portion of the lens barrel and at least some of the optic elements disposed in the lens barrel.

10. The vehicular camera of claim 1, wherein the other portions of the lens assembly are electrically isolated from the portion of the lens assembly.

11. The vehicular camera of claim 1, wherein the portion of the lens assembly comprises an electrically conductive material, and wherein the other portions of the lens assembly comprise a non-electrically conductive material.

12. The vehicular camera of claim 1, wherein, with the vehicular camera disposed at the vehicle and with the electrical connector electrically connected with the electrical connector of the vehicle, a control controls operation of the induction heating device responsive at least in part to temperature at the lens assembly.

13. A vehicular camera comprising:
a camera housing;
a lens assembly comprising a lens barrel and a lens having optic elements disposed in the lens barrel;
an imager printed circuit board (imager PCB), the imager PCB having a first side and a second side separated from the first side by a thickness of the imager PCB, wherein an imager is disposed at the first side of the imager PCB;
wherein the imager PCB is at least partially housed by the camera housing;
wherein the lens assembly is at least partially housed by the camera housing;
an induction heating device comprising an inductive coil that at least partially circumscribes at least a portion of the lens assembly;
wherein the camera housing includes an electrical connector that is configured to electrically connect with an electrical connector of a vehicle when the vehicular camera is disposed at the vehicle to electrically connect electronic circuitry of the vehicular camera to a power source of the vehicle;
wherein, with the vehicular camera disposed at the vehicle and with the electrical connector electrically connected with the electrical connector of the vehicle, the induction heating device, when electrically powered, generates a magnetic field, and wherein the magnetic field induces electrical current at least in the portion of the lens assembly that is at least partially circumscribed by the inductive coil of the induction heating device to heat at least the portion of the lens assembly that is at least partially circumscribed by the inductive coil of the induction heating device;
wherein, with the vehicular camera disposed at the vehicle and with the electrical connector electrically connected with the electrical connector of the vehicle, a control controls operation of the induction heating device responsive at least in part to temperature at the lens assembly; and
wherein, responsive to determination that the temperature at the lens assembly is below a first threshold temperature, the control operates the induction heating device to increase the temperature of the lens assembly of the vehicular camera.

14. The vehicular camera of claim 1, wherein the vehicular camera is configured to be disposed at an exterior portion of the vehicle so as to have a field of view exterior of the vehicle.

15. The vehicular camera of claim 1, wherein the heat generated at the portion of the lens assembly heats at least part of the lens that is adjacent to or circumscribed by the portion of the lens assembly to deice the lens or limit condensation at the lens.

16. A vehicular camera comprising:
a camera housing;
a lens assembly comprising (i) a lens barrel, (ii) a lens having optic elements disposed in the lens barrel, and (iii) a lens spacer disposed between adjacent optic elements of the lens;
an imager printed circuit board (imager PCB), the imager PCB having a first side and a second side separated from the first side by a thickness of the imager PCB, wherein an imager is disposed at the first side of the imager PCB;
wherein the imager PCB is at least partially housed by the camera housing;
wherein the lens assembly is at least partially housed by the camera housing;
an induction heating device comprising an inductive coil that at least partially circumscribes the lens barrel at the lens spacer;
wherein the lens spacer comprises an electrically conductive material, and wherein the lens barrel and the optic elements of the lens assembly comprise a non-electrically conductive material;
wherein the camera housing includes an electrical connector that is configured to electrically connect with an electrical connector of a vehicle when the vehicular camera is disposed at the vehicle to electrically connect electronic circuitry of the vehicular camera to a power source of the vehicle;
wherein, with the vehicular camera disposed at the vehicle and with the electrical connector electrically connected with the electrical connector of the vehicle, the induction heating device, when electrically powered, generates a magnetic field, and wherein the magnetic field induces electrical current at least in the lens spacer to heat the lens spacer to heat at least one optic element at or near the lens spacer; and
wherein the induction heating device, when electrically powered, generates the magnetic field to induce electrical current in the lens spacer, and wherein the generated magnetic field does not induce electrical current in the lens barrel and lens optics of the lens assembly.

17. A vehicular camera comprising:
a camera housing;
a lens assembly comprising (i) a lens barrel, (ii) a lens having optic elements disposed in the lens barrel, and (iii) a lens spacer disposed between adjacent optic elements of the lens;
an imager printed circuit board (imager PCB), the imager PCB having a first side and a second side separated from the first side by a thickness of the imager PCB, wherein an imager is disposed at the first side of the imager PCB;
wherein the imager PCB is at least partially housed by the camera housing;
wherein the lens assembly is at least partially housed by the camera housing;
an induction heating device comprising an inductive coil that at least partially circumscribes the lens barrel at the lens spacer;

wherein the lens spacer comprises an electrically conductive material, and wherein the lens barrel and the optic elements of the lens assembly comprise a non-electrically conductive material;

wherein the camera housing includes an electrical connector that is configured to electrically connect with an electrical connector of a vehicle when the vehicular camera is disposed at the vehicle to electrically connect electronic circuitry of the vehicular camera to a power source of the vehicle;

wherein, with the vehicular camera disposed at the vehicle and with the electrical connector electrically connected with the electrical connector of the vehicle, the induction heating device, when electrically powered, generates a magnetic field, and wherein the magnetic field induces electrical current at least in the lens spacer to heat the lens spacer to heat at least one optic element at or near the lens spacer; and wherein the lens assembly comprises an innermost optic element, an outermost optic element, and at least one middle optic element disposed between the outermost optic element and the innermost optic element, and wherein the lens assembly comprises a plurality of lens spacers disposed between adjacent optic elements, and wherein the induction heating device, when electrically powered, generates the magnetic field to induce electrical current in each of the lens spacers to generate heat in the lens spacers to heat each of the optic elements.

18. The vehicular camera of claim 16, wherein, with the vehicular camera disposed at the vehicle and with the electrical connector electrically connected with the electrical connector of the vehicle, a control controls operation of the induction heating device responsive at least in part to temperature at the lens assembly.

19. A vehicular camera comprising:
a camera housing;
a lens assembly comprising (i) a lens barrel, (ii) a lens having optic elements disposed in the lens barrel, and (iii) a lens spacer disposed between adjacent optic elements of the lens;
an imager printed circuit board (imager PCB), the imager PCB having a first side and a second side separated from the first side by a thickness of the imager PCB, wherein an imager is disposed at the first side of the imager PCB;
wherein the imager PCB is at least partially housed by the camera housing;
wherein the lens assembly is at least partially housed by the camera housing;
an induction heating device comprising an inductive coil that at least partially circumscribes the lens barrel at the lens spacer;
wherein the lens spacer comprises an electrically conductive material, and wherein the lens barrel and the optic elements of the lens assembly comprise a non-electrically conductive material;
wherein the camera housing includes an electrical connector that is configured to electrically connect with an electrical connector of a vehicle when the vehicular camera is disposed at the vehicle to electrically connect electronic circuitry of the vehicular camera to a power source of the vehicle;
wherein, with the vehicular camera disposed at the vehicle and with the electrical connector electrically connected with the electrical connector of the vehicle, the induction heating device, when electrically powered, generates a magnetic field, and wherein the magnetic field induces electrical current at least in the lens spacer to heat the lens spacer to heat at least one optic element at or near the lens spacer;

wherein, with the vehicular camera disposed at the vehicle and with the electrical connector electrically connected with the electrical connector of the vehicle, a control controls operation of the induction heating device responsive at least in part to temperature at the lens assembly; and wherein, responsive to determination that the temperature at the lens assembly is below a first threshold temperature, the control operates the induction heating device to increase the temperature of the lens assembly of the vehicular camera, and wherein, responsive to determination that the temperature at the lens assembly is at or above a second threshold temperature greater than the first threshold temperature, the control stops operating the induction heating device.

20. The vehicular camera of claim 16, wherein the vehicular camera is configured to be disposed at an exterior portion of the vehicle so as to have a field of view exterior of the vehicle.

21. A vehicular camera comprising:
a camera housing;
a lens assembly comprising (i) a lens barrel, (ii) a lens having optic elements disposed in the lens barrel, and (iii) a plurality of lens spacers disposed between adjacent optic elements;
wherein with the vehicular camera disposed at a vehicle, an outermost optic element is exposed at an exterior portion of the vehicle;
an imager printed circuit board (imager PCB), the imager PCB having a first side and a second side separated from the first side by a thickness of the imager PCB, wherein an imager is disposed at the first side of the imager PCB;
wherein the imager PCB is at least partially housed by the camera housing;
wherein the lens assembly is at least partially housed by the camera housing;
an induction heating device comprising an inductive coil that at least partially circumscribes the plurality of lens spacers;
wherein the camera housing includes an electrical connector that is configured to electrically connect with an electrical connector of a vehicle when the vehicular camera is disposed at the vehicle to electrically connect electronic circuitry of the vehicular camera to a power source of the vehicle;
wherein, with the vehicular camera disposed at the vehicle and with the electrical connector electrically connected with the electrical connector of the vehicle, the induction heating device, when electrically powered, generates a magnetic field, and wherein the magnetic field induces electrical current in the plurality of lens spacers to heat the plurality of lens spacers to heat each of the optic elements; and
wherein the induction heating device, when electrically powered, generates the magnetic field to induce electrical current in each of the plurality of lens spacers, and wherein the generated magnetic field does not induce electrical current in other portions of the lens assembly.

22. The vehicular camera of claim 21, wherein the other portions of the lens assembly are electrically isolated from the plurality of lens spacers.

23. The vehicular camera of claim 21, wherein each of the plurality of lens spacers comprises an electrically conductive material, and wherein the other portions of the lens assembly comprise a non-electrically conductive material.

24. A vehicular camera comprising:
- a camera housing;
- a lens assembly comprising (i) a lens barrel, (ii) a lens having optic elements disposed in the lens barrel, and (iii) a plurality of lens spacers disposed between adjacent optic elements;
- wherein with the vehicular camera disposed at a vehicle, an outermost optic element is exposed at an exterior portion of the vehicle;
- an imager printed circuit board (imager PCB), the imager PCB having a first side and a second side separated from the first side by a thickness of the imager PCB, wherein an imager is disposed at the first side of the imager PCB;
- wherein the imager PCB is at least partially housed by the camera housing;
- wherein the lens assembly is at least partially housed by the camera housing;
- an induction heating device comprising an inductive coil that at least partially circumscribes the plurality of lens spacers;
- wherein the camera housing includes an electrical connector that is configured to electrically connect with an electrical connector of a vehicle when the vehicular camera is disposed at the vehicle to electrically connect electronic circuitry of the vehicular camera to a power source of the vehicle;
- wherein, with the vehicular camera disposed at the vehicle and with the electrical connector electrically connected with the electrical connector of the vehicle, the induction heating device, when electrically powered, generates a magnetic field, and wherein the magnetic field induces electrical current in the plurality of lens spacers to heat the plurality of lens spacers to heat each of the optic elements; and
- wherein, with the vehicular camera disposed at the vehicle and with the electrical connector electrically connected with the electrical connector of the vehicle, a control controls operation of the induction heating device responsive at least in part to temperature at the lens assembly, and wherein, responsive to determination that the temperature at the lens assembly is below a first threshold temperature, the control operates the induction heating device to increase the temperature of the lens assembly of the vehicular camera, and wherein, responsive to determination that the temperature at the lens assembly is at or above a second threshold temperature greater than the first threshold temperature, the control stops operating the induction heating device.

25. The vehicular camera of claim 21, wherein the vehicular camera is configured to be disposed at an exterior portion of the vehicle so as to have a field of view exterior of the vehicle.

* * * * *